Jan. 10, 1950
W. J. BLAKE
2,494,225
SCARIFYING BULLDOZER
Filed March 29, 1948
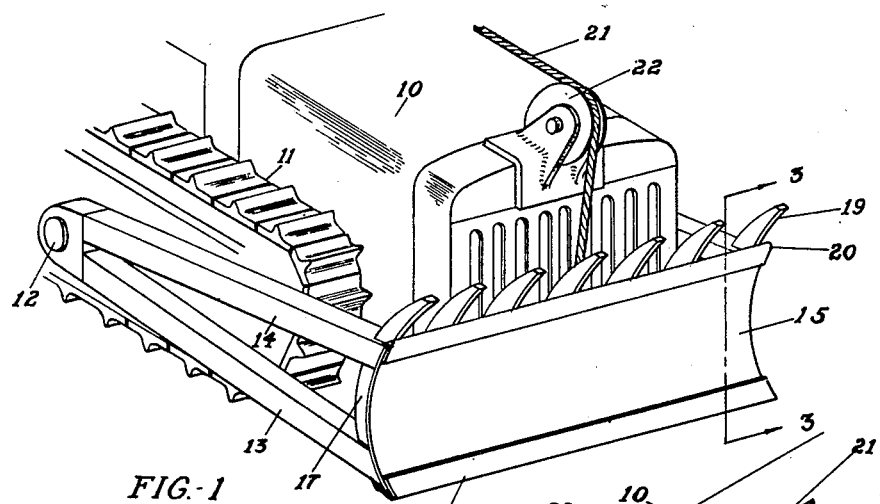
FIG.-1
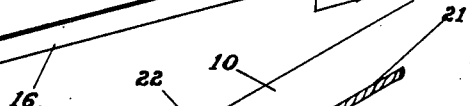
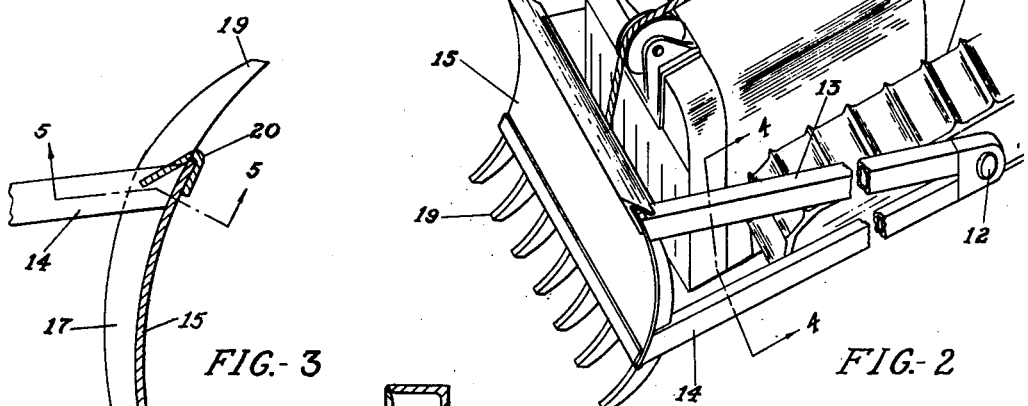
FIG.-3
FIG.-2
FIG.-4
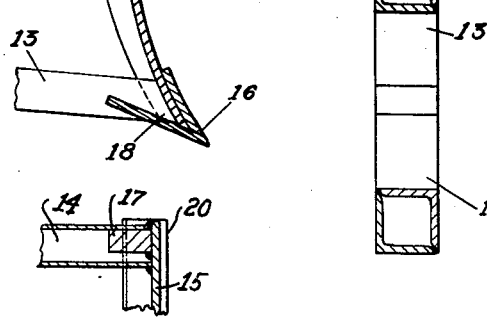
FIG.-5
INVENTOR.
W. J. BLAKE
BY
ATTORNEY Patented Jan. 10, 1950

2,494,225

UNITED STATES PATENT OFFICE 2,494,225

SCARIFYING BULLDOZER

William J. Blake, Sandy, Oreg.

Application March 29, 1948, Serial No. 17,657

1 Claim. (Cl. 37—145)

This invention relates generally to earth working machinery and particularly to a scarifying bulldozer.

The main object of this invention is to provide a bulldozer blade with scarifying teeth along one edge and a cutting edge along the opposite edge, in order that the usefulness of the equipment may be increased and that there will be a substantial saving in weight compared with the use of separate bulldozing and scarifying units.

The second object is to so construct the device that it can be converted from one use to another without an objectionable expense for labor and material.

I accomplish these and other objects in the manner set forth in the following specification, as illustrated in the accompanying drawing, in which:

Fig. 1 is a perspective view of a tractor equipped with a bulldozing blade with the cutting blade in an operative position.

Fig. 2 is a perspective view showing the scarifying teeth in operative position.

Fig. 3 is a section taken along the line 3—3 in Fig. 1.

Fig. 4 is a section taken along the line 4—4 in Fig. 2.

Fig. 5 is a fragmentary section taken along the line 5—5 in Fig. 3.

Like numbers of reference refer to the same or similar parts throughout the several views.

Referring in detail to the drawing, there is shown a common form of tractor 10, having ground engaging track laying elements 11 and the trunnions 12 support the arms 13 and 14 which carry the usual bulldozer blade 15, having the cutting blade 16 attached along one edge thereof.

The construction thus far described is now in common use.

Referring particularly to my invention, the same will be seen to consist in a plurality of scarifying teeth 17 secured to the back of the blade 15, having their ends 18 near the blade 16 and having their scarifying points 19 projecting beyond the blade edge 20.

It is convenient to construct the arms 13 and 14 of pairs of angle bars which are welded along their diagonal corners, the endmost bars 17 extend through the tips of the arms 13 and 14.

The position of the blade 16 or the points 19 is determined by the operator through a cable winding mechanism (not shown) whose line 21 passes over a sheave 22 mounted on the tractor 10.

The use of the device is obvious since it is merely a matter of reversing the unit on the trunnions 12 in order to bring the desired element into contact with the ground.

I claim:

An earth working implement consisting of an arcuate elongated blade having parallel arms at the outer ends thereof, extending rearwardly from the convex side of the blade, a V-shaped cutting blade mounted along one edge of said arcuate blade, a V-shaped blade edge mounted along the opposite edge of said arcuate blade, a plurality of scarifying teeth curved to conform to the back of said curved blade and secured along the width thereof, extending beyond the blade edge and pivotal supports for the rearmost ends of said arms occupying a plane passing through the axis of blade curvature and through the middle of the blade width.

WILLIAM J. BLAKE.

REFERENCES CITED

The following references are of record in the file of this patent:

UNITED STATES PATENTS

| Number | Name | Date |
|---|---|---|
| 178,948 | Patterson | June 20, 1876 |
| 1,741,933 | Gunnison | Dec. 31, 1929 |
| 2,420,027 | Austin | May 6, 1947 |